(12) United States Patent
Kouma et al.

(10) Patent No.: US 9,045,031 B2
(45) Date of Patent: Jun. 2, 2015

(54) POWER UNIT FOR UTILITY VEHICLE

(71) Applicant: Kawasaki Jukogyo Kabushiki Kaisha, Hyogo (JP)

(72) Inventors: Yuji Kouma, Takasago (JP); Seiji Itoo, Akashi (JP); Taisuke Morita, Amagasaki (JP); Ayumi Hamada, Akashi (JP)

(73) Assignee: KAWASAKI JUKOGYO KABUSHIKI KAISHA, Hyogo (JP)

( * ) Notice: Subject to any disclaimer, the term of this patent is extended or adjusted under 35 U.S.C. 154(b) by 263 days.

(21) Appl. No.: 13/728,126

(22) Filed: Dec. 27, 2012

(65) Prior Publication Data

US 2014/0187372 A1 Jul. 3, 2014

(51) Int. Cl.
*B60K 5/12* (2006.01)
*B60K 5/04* (2006.01)

(52) U.S. Cl.
CPC .............. *B60K 5/1216* (2013.01); *B60K 5/04* (2013.01); *B60Y 2200/22* (2013.01); *B60Y 2200/41* (2013.01)

(58) Field of Classification Search
CPC ...... B60K 5/12; B60K 5/1208; B60K 5/1216; B60K 5/1241; B60K 17/00; B60K 17/04
USPC ......... 180/291, 292, 299, 300, 376, 377, 381, 180/383; 123/195 R, 195 A
See application file for complete search history.

(56) References Cited

U.S. PATENT DOCUMENTS

| | | | |
|---|---|---|---|
| 6,604,600 B2 * | 8/2003 | Fournier et al. | 180/299 |
| 6,941,920 B1 * | 9/2005 | Thurm et al. | 123/195 C |
| 7,407,031 B2 * | 8/2008 | Hayashi et al. | 180/311 |
| 7,506,718 B2 | 3/2009 | Morita et al. | |
| 7,708,103 B2 * | 5/2010 | Okuyama et al. | 180/299 |

* cited by examiner

*Primary Examiner* — John Walters
(74) *Attorney, Agent, or Firm* — Wenderoth, Lind & Ponack, L.L.P.

(57) ABSTRACT

An engine and a transmission are connected to each other via a connecting bracket interposed therebetween in the vehicular lengthwise direction. The engine is provided with a first connector having a first mounting hole substantially parallel to a vehicle lengthwise direction, and a first tightening member to be inserted into the first mounting hole on a side opposite to the engine connects the first end of the connecting bracket to the first connector. The transmission is provided with a second connector having a second mounting hole penetrating in a vehicular widthwise direction, and a second tightening member to be inserted into the second mounting hole connects the second end of the connecting bracket to the second connector.

4 Claims, 13 Drawing Sheets

POWER UNIT FOR UTILITY VEHICLE

BACKGROUND OF THE INVENTION

1. Field of the Invention

The present invention relates to a power unit for utility vehicle to be mounted to a chassis frame.

2. Description of the Related Art

A power unit for utility vehicle is configured by an engine, a transmission, and the like in a structure in which the transmission is formed independently of the engine, the transmission is molded integrally with a crank case for the engine, or the like. In the structure in which a transmission is formed independently of an engine, for example, the engine and the transmission are securely arranged on a sub frame in a lengthwise direction, and then, the sub frame is fixed to a chassis frame via a damper.

However, in a structure in which an engine and a transmission are mounted to a sub frame, the arrangement space for a power unit becomes larger, and further, the weight of the sub frame is heavy, thereby increasing the weight of the entire vehicle. As a prior art document of a utility vehicle mounting a power unit thereon, there is U.S. Pat. No. 7,506,718 filed by the present applicant.

SUMMARY OF THE INVENTION

The present invention has been made to solve the above-described problem. An object of the present invention is to provide a power unit for utility vehicle, in which an engine and a transmission are formed independently of each other, wherein an increase in weight of a vehicle is suppressed while the engine and the transmission can be readily connected to each other without using any sub frame.

In order to solve the above-described problem, according to the present invention, there is provided a power unit for a utility vehicle to be mounted to a chassis frame, the power unit including: an engine; a transmission arranged on one side in a vehicular lengthwise direction with respect to the engine and formed independently of the engine; a V belt continuously variable transmission for connecting a crankshaft of the engine and an input shaft of the transmission to each other in a power transmittable manner; and a connecting bracket interposed between the engine and the transmission. The engine is provided with a first connector having, at a surface facing the transmission, a first mounting hole substantially parallel to a vehicular lengthwise direction, wherein a first tightening member to be inserted into the first mounting hole on a side opposite to the engine in the lengthwise direction connects one end of the connecting bracket to the first connector. Moreover, the transmission is provided with a second connector having, at an end facing the engine, a second mounting hole penetrating in a vehicular widthwise direction, wherein a second tightening member to be inserted into the second mounting hole in the vehicular widthwise direction connects the other end of the connecting bracket to the second connector.

With the above configuration, when the power unit is mounted to the chassis frame, no heavy sub frame is needed, thereby reducing the weight of the vehicle. In addition, in connecting the engine and the transmission to each other, first, one end of the connecting bracket is connected to the engine via the first tightening member in the vehicular lengthwise direction, and thereafter, the other end of the connecting bracket is connected to the engine via the second tightening member in the vehicular widthwise direction, so that the connecting operation can be readily performed even at the narrow space defined between the engine and the transmission.

Moreover, since the engine and the transmission are rigidly connected to each other via the connecting bracket, the relative positions of the engine and the transmission can be accurately determined.

Particularly, in the structure in which the crankshaft and the input shaft of the transmission are connected to each other via the V belt type continuously variable transmission in a power transmittable manner, the relative positions of the V belt type continuously variable transmission in the vehicular widthwise and lengthwise directions with respect to the engine and the transmission influence the mounting accuracy of the V belt type continuously variable transmission. However, the engine and the transmission are rigidly connected via the connecting bracket, thus achieving the accurate incorporation.

The present invention preferably includes the following configurations.

(a) The first connector of the engine has a stopper that abuts against the connecting bracket to lock the connecting bracket at a predetermined position in the vehicular widthwise direction.

With the above configuration, the relative positions of the engine and the connecting bracket in the vehicular widthwise direction can be readily determined with high accuracy.

(b) The connecting bracket is formed such that an end on the transmission side is lower than an end on the engine side.

With the above configuration, when the connecting bracket is mounted to the first connector via the first tightening member substantially in the vehicular lengthwise direction, the end on the second connector side is lower, thus widely securing the operation space for the first tightening member in the vehicular lengthwise direction, so as to facilitate the tightening operation of the first tightening member.

(c) The connecting bracket is arranged substantially at the centers of the engine and the transmission in the vehicular widthwise direction; a lower surface of the connecting bracket is supported at an upper surface of the chassis frame via a mounting mechanism with a damper; the engine and the transmission in the vehicular widthwise direction are supported substantially at the centers thereof at the upper surface of the chassis frame via mounting mechanisms with dampers; and a torque rod for suppressing the engine from rolling in the vehicular widthwise direction is interposed between the engine and the chassis frame.

With the above configuration, the entire power unit is put on the chassis frame by the three damper mechanisms arranged at the center in the vehicular widthwise direction, and is suppressed from rocking around the vehicular lengthwise axis by the torque rod. Consequently, the traveling vibrations to be transmitted to the power unit during the traveling are finally converted into the vertical vibrations, to be thus absorbed by the dampers. Thus, the mounting mechanism having the simple damper can accurately absorb the vibrations to be exerted on the power unit.

DETAILED DESCRIPTION OF THE INVENTION

Embodiments of the Invention

FIGS. 1 to 15 show a power unit for utility vehicle according to the present invention. A description will be given of one embodiment according to the present invention with reference to the attached drawings. For the sake of convenience of explanation, in the following descriptions, the lengthwise direction of an utility vehicle is referred tows the lengthwise direction of an engine and other component parts; and the right and left viewed from a passenger riding in the utility vehicle (the right and left viewed from behind the vehicle) in a vehicular widthwise direction are referred to as the right and left of the vehicle, the engine, and the other component parts.

Figure 1:
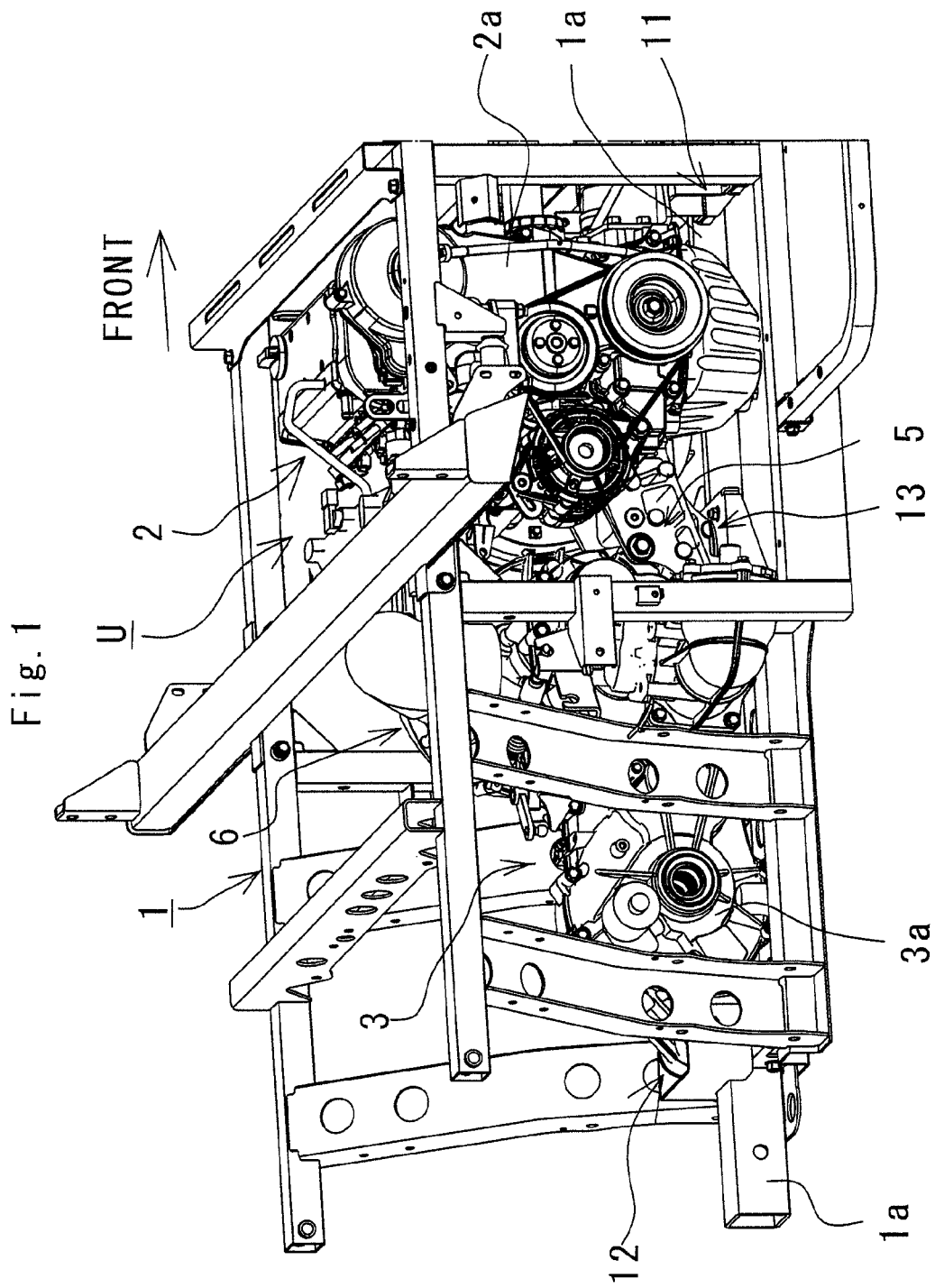
FIG. 1 is a perspective view showing a power unit for utility vehicle according to the present invention.

FIG. 1 is a perspective view showing a power unit U, wherein a chassis frame 1 is constituted of a plurality of frame members and formed into a substantially rectangular shape being elongated in a vehicular lengthwise direction. The power unit U is disposed at a rear portion of the chassis frame 1. The power unit U is supported at an upper surface of a lower frame member 1a of the chassis frame 1. FIG. 1 shows only the rear portion of the chassis frame 1, and the front portion of the chassis frame 1 is omitted.

The power unit U is provided with an engine 2, a gear type transmission 3 disposed at a rear portion of the engine 2, a connecting bracket 5 for rigidly connecting the engine 2 and the gear type transmission 3 to each other, and a V-belt type continuously variable transmission 6 disposed on the left of the engine 2 and the gear type transmission 3. The engine 2 is a parallel 3-cylinder engine, in which three cylinders are arranged in a vehicular widthwise direction inside of a cylinder block 2a. The gear type transmission 3 integrally includes a final reduction gear case 3a for rear wheels at a rear portion thereof.

The connecting bracket 5 is interposed between the engine 2 and the gear type transmission 3 in the vehicular lengthwise direction. The connecting bracket 5 is adapted to rigidly connect a rear end of the cylinder block 2a of the engine 2 and a fore end of the gear type transmission 3 to each other.

Figure 3:
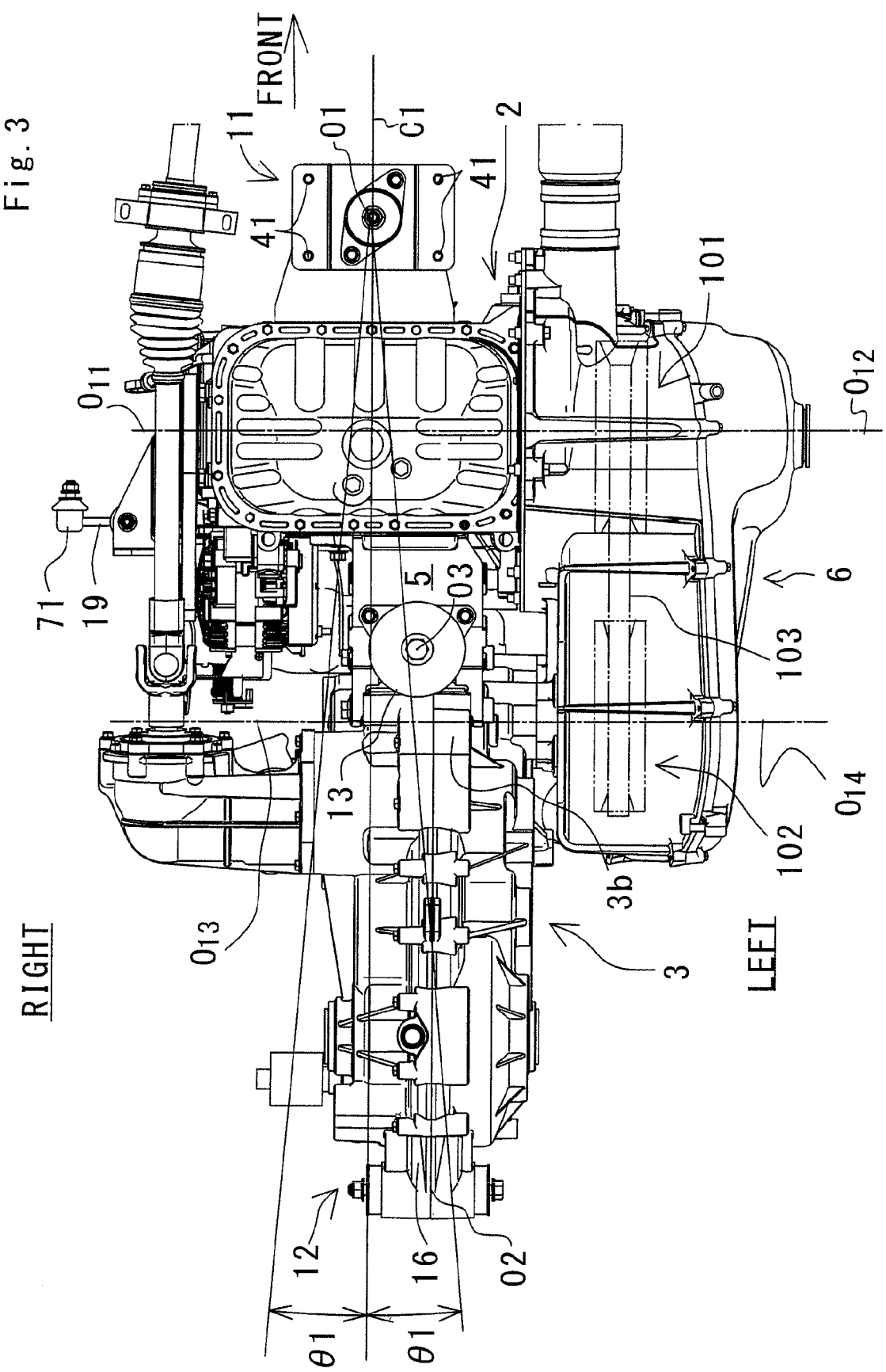
FIG. 3 is a bottom view showing the power unit shown in FIG. 1.

FIG. 3 is a bottom view showing the power unit U, wherein the V-belt type continuously variable transmission 6 is, as is well known, configured by an input drive shaft (having an axis O12) connected to a crankshaft (having an axis O11), a drive pulley 101 disposed on the input shaft, an output driven shaft (having an axis O14) connected to a gearshift input shaft (having an axis O13) of the gear type transmission 3, a driven pulley 102 disposed on the speed change output shaft, and a V belt 103 stretched between both of the pulleys. The V-belt type continuously variable transmission 6 is designed to continuously change the speed of the rotation of the crankshaft so as to transmit it to the gearshift input shaft of the gear type transmission 3.

Figure 2:
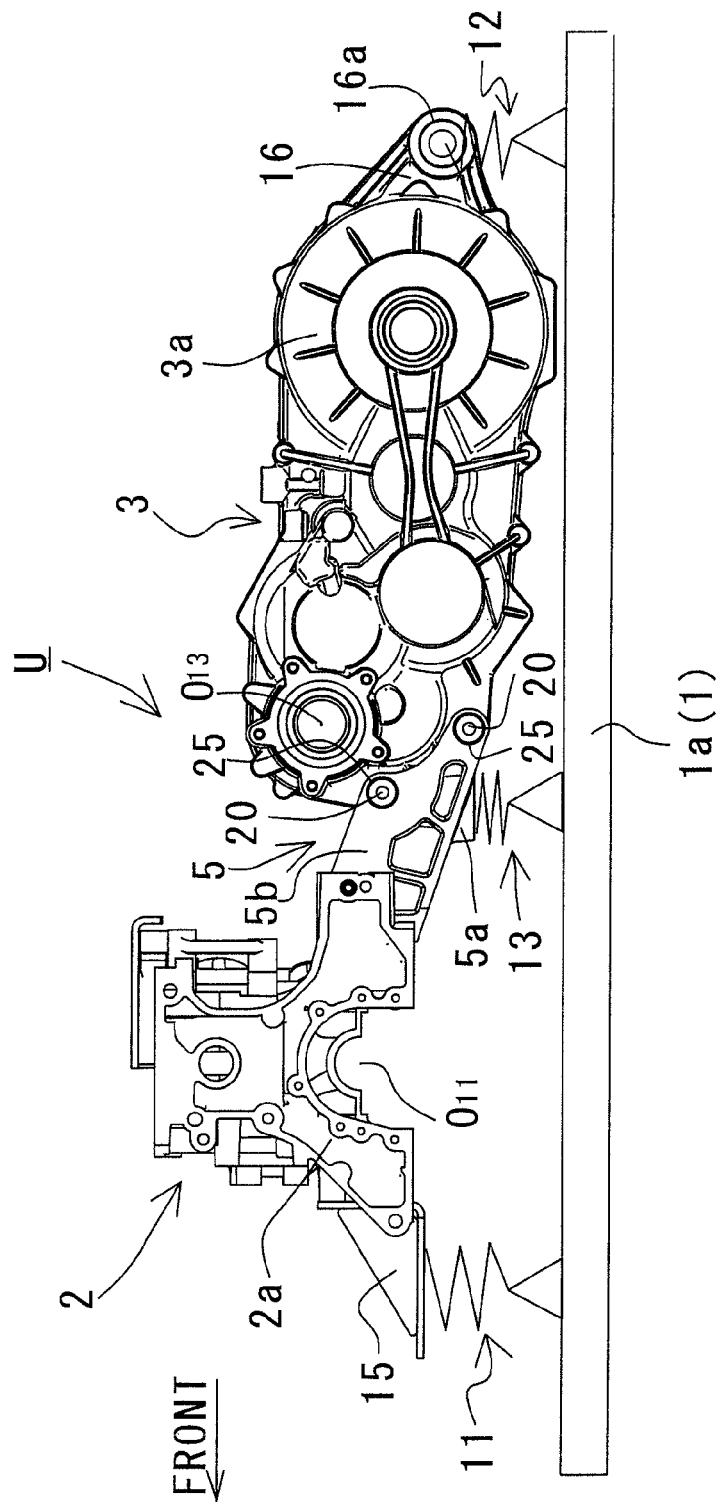
FIG. 2 is a left side view schematically showing the power unit shown in FIG. 1.

FIG. 2 is a left side view schematically showing the power unit of FIG. 1. The entire power unit U is resiliently supported at an upper surface of a lower frame member 1a of the chassis frame 1 by means of three mounting mechanisms, that is, a front mounting mechanism 11, a rear mounting mechanism 12, and an intermediate mounting mechanism 13. Each of the three mounting mechanisms 11, 12, and 13 is equipped with a damper function. The front mounting mechanism 11 is adapted to resiliently support a front bracket 15 from below. The front bracket 15 is securely fixed to a fore lower end of the cylinder block 2a of the engine 2. The rear mounting mechanism 12 is designed to resiliently support a rear bracket 16 from below. The rear bracket 16 is formed at a rear end of the gear type transmission 3. The intermediate mounting mechanism 13 is adapted to resiliently support a bottom wall 5a of the connecting bracket 5 from below.

[Connecting Structure Via Connecting Bracket 5]

In FIG. 2, the connecting bracket 5 is inclined downward of a rear portion thereof such that a fore (first) end thereof is higher than the rear (second) end thereof. The rear portion of the connecting bracket 5 is connected to a lower half of a fore end of the gear type transmission 3 via two bolts 20 serving as second tightening members. The two bolts 20 are inserted into bolt insertion holes or the like, described later, from a right side of the connecting bracket 5.

Figure 5:
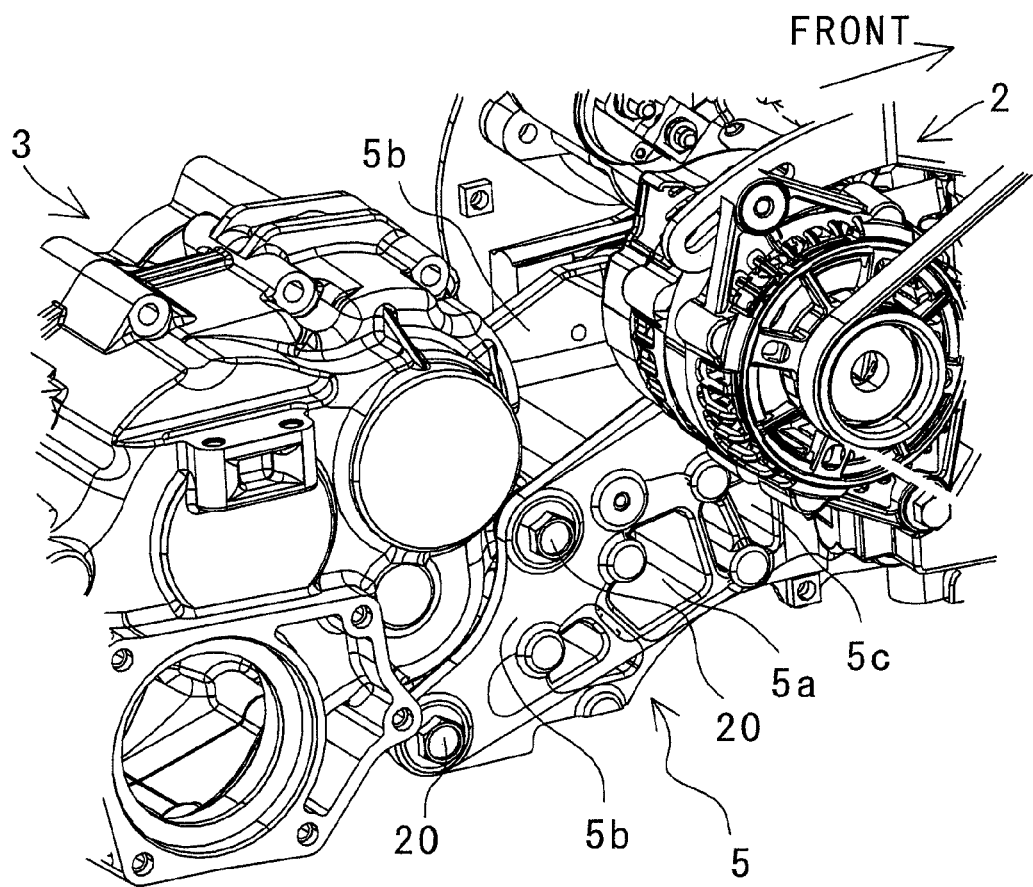
FIG. 5 is an enlarged perspective view showing a connected section of the power unit shown in FIG. 1, as viewed upward on the rear right side.

FIG. 5 is a perspective view showing a connected section via the connecting bracket 5, as viewed on the right from upper rear portion. The connecting bracket 5 includes the bottom wall 5a, a pair of side walls 5b erecting from right and left ends of the bottom wall 5a, and a front wall 5c as mentioned above. The walls are formed to have a U-shaped cross section substantially perpendicular to the lengthwise direction of the connecting bracket 5.

Description will be made on the connecting structure at the rear end of the connecting bracket 5.

Figure 4:
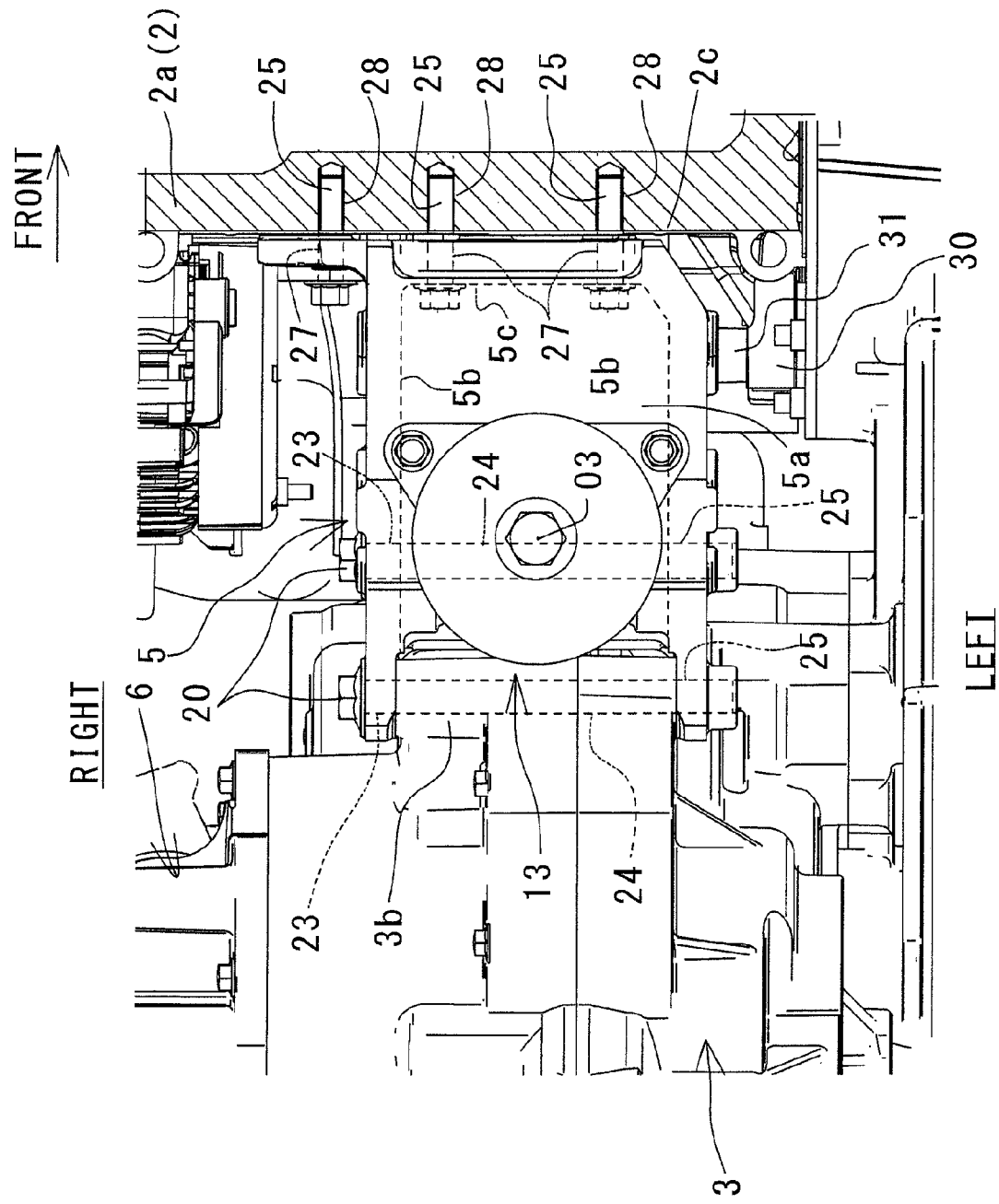
FIG. 4 is an enlarged bottom view showing connecting bracket shown in FIG. 1.

FIG. 4 is an enlarged bottom view showing the connecting bracket 5. A fore end boss (i.e., a second connector) 3b of the gear type transmission 3 is fitted between rear ends of the right and left side walls 5b of the connecting bracket 5, thereby determining the relative position between the connecting bracket 5 and the transmission 3 in the vehicular widthwise direction. Bolt insertion holes 23 and 24 (i.e., second mounting holes) whose axes penetrate in the vehicular widthwise direction are formed at one of the right and left side walls 5b, for example, the right side wall 5b and the fore end boss 3b of the transmission 3, respectively. In contrast, female screw holes 25 are formed at positions corresponding to the bolt insertion holes 23 and 24 on the left side wall 5b of the connecting bracket 5. The bolt 20 is inserted into the bolt insertion hole 23 on the right side wall 5b of the connecting bracket 5 and the bolt insertion hole 24 of the transmission 3 from the right portion of the connecting bracket 5, to be screwed to the female screw holes 25 formed on the left wall 5b. Consequently, the fore end boss 3b of the transmission 3 and the rear end of the connecting bracket 5 are connected to each other. The shaft portion of the bolt 20 is fitted to the bolt insertion holes 23 and 24, thereby determining the lengthwise and vertical positions of the connecting bracket 5 and the transmission 3.

Next, a description will be given of the connecting structure for the fore end of the connecting bracket 5.

Figure 6:
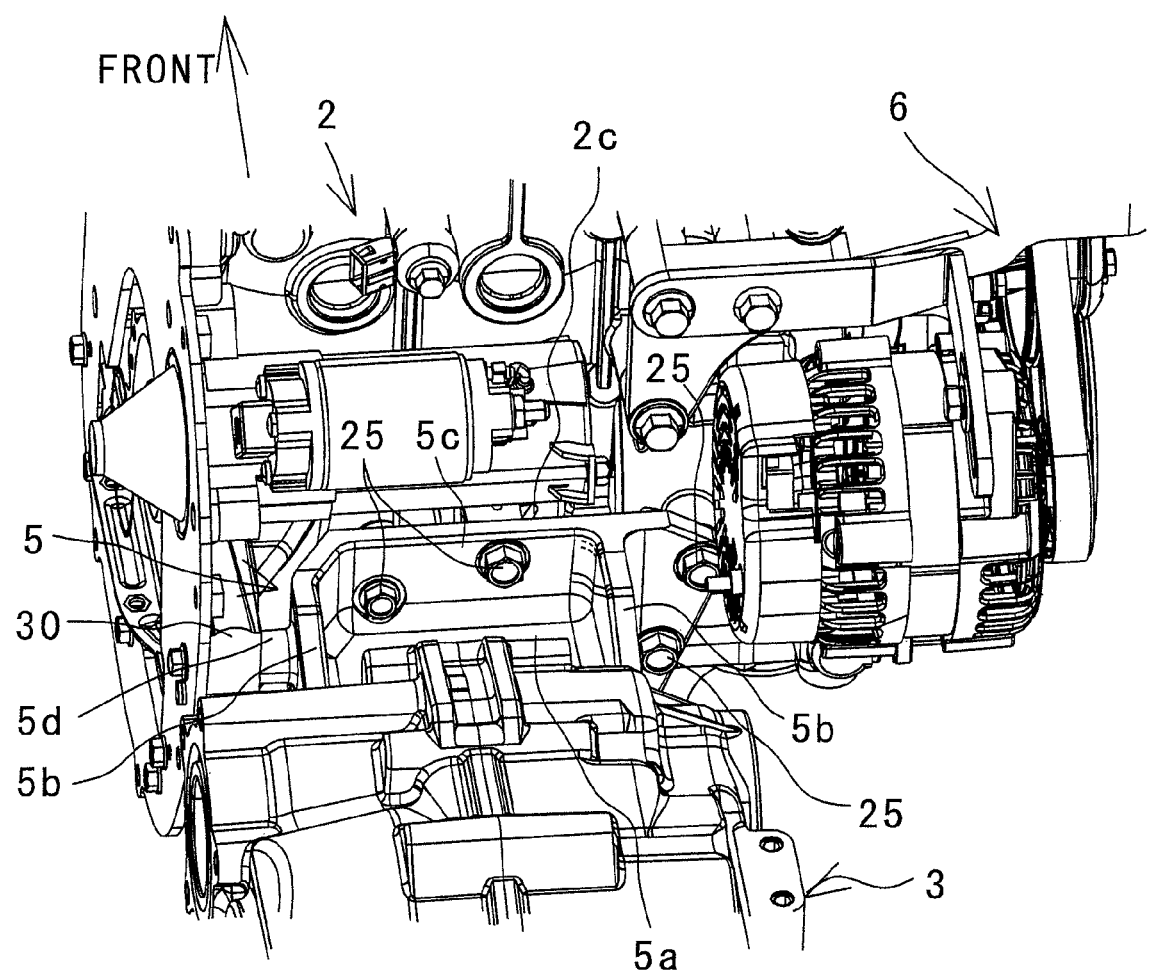
FIG. 6 is an enlarged perspective view showing the connected section of the power unit shown in FIG. 1, as viewed on the upper rear side.

FIG. 6 is a perspective view showing the fore portion of a connected section via the connecting bracket 5. The fore wall 5c of the connecting bracket 5 is formed substantially vertically, and further, extends rightward from the right side wall 5b.

The front wall 5c is connected to a rear end connecting surface (i.e., a first connector) 2c of the cylinder block 2a of the engine 2 via two bolts (i.e., first tightening members) 25 arranged between the right and left side walls 5b and two bolts (i.e., first tightening members) 25 arranged at the rightward extending portion, that is, four bolts in total.

In FIG. 4, the connecting surface 2c at the rear end of the cylinder block 2a is formed within a substantially vertical plane substantially orthogonal to the vehicular lengthwise direction, and further, has four female screw holes (i.e., first mounting holes) 28 corresponding to the bolts 25, respectively. Each of the female screw holes 28 is formed in such a manner that its axis extends in the vehicular lengthwise direction. Moreover, bolt insertion holes 27 corresponding to each of the female screw holes 28 are formed on the front wall 5c of the connecting bracket 5. Each of the bolt insertion holes 27 is formed in such a manner that its axis extends in the vehicular lengthwise direction.

A fore end of the front wall 5c of the connecting bracket 5 is matched with the connecting surface 2c of the cylinder block 2a. Each of the bolts 25 is inserted into each of the bolt insertion holes 27 on the front wall 5c from the rear portion. And then, the bolt 25 is screwed into the female screw hole 28 at the connecting surface 2c. In this manner, the front wall 5c of the connecting bracket 5 is connected to the rear end connecting surface 2c of the cylinder block 2a.

In the present embodiment, existing female screw holes that have been formed for mounting other fixtures are utilized as the four female screw holes 28 at the rear end connecting surface 2c of the cylinder block 2a.

A stopper 30 facing the left side wall 5b of the connecting bracket 5 from the left portion is formed at a rear left end of the cylinder block 2a. Meanwhile, a portion 31 to be stopped is formed on the left side wall 5b of the connecting bracket 5, and projects leftward. The portion 31 to be stopped abuts against the stopper 30 from right side, thereby determining a relative position of the connecting bracket 5 with respect to the cylinder block 2a in the vehicular widthwise direction.

A lower surface of a rear half of the bottom wall 5a of the connecting bracket 5 is substantially horizontally formed, and the intermediate mounting mechanism 13 is connected to the lower surface thereof.

[Mounting Structure for Power Unit U]

Figure 15:
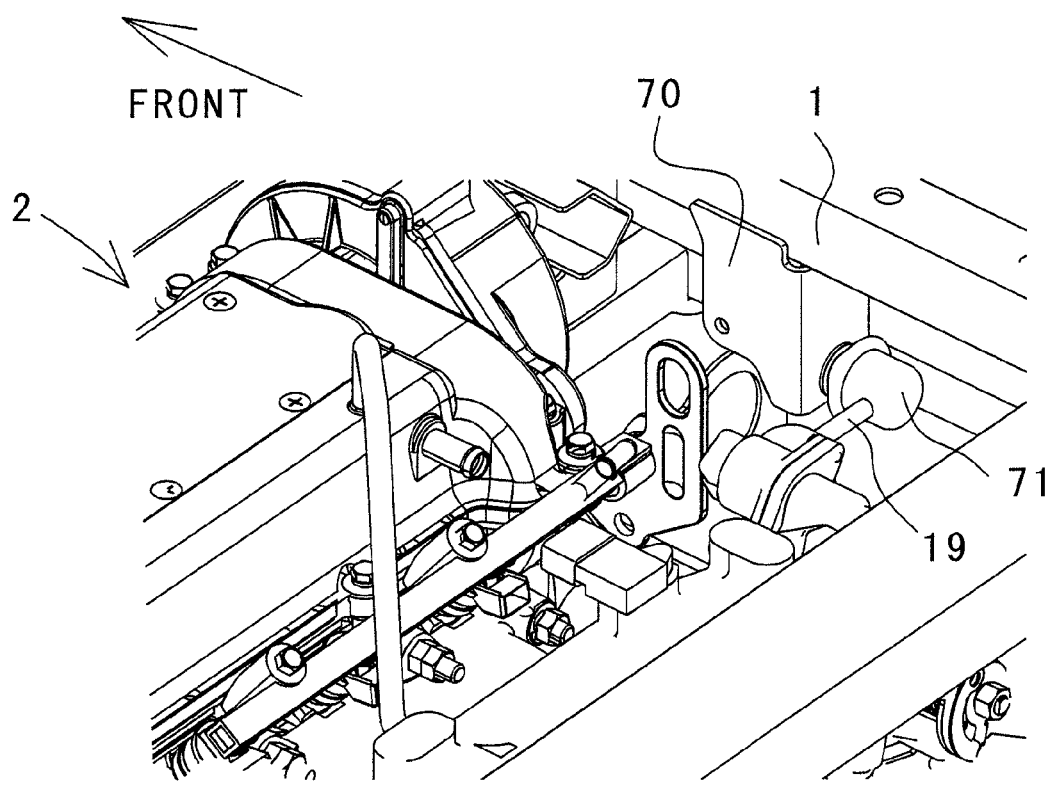
FIG. 15 is a perspective view showing the vicinity of a torque rod for the power unit shown in FIG. 1.

In FIG. 2, the power unit U is mounted to the upper surface of the lower frame member 1a by the front, rear, and intermediate mounting mechanisms 11, 12, and 13 with the dampers, as described above. Moreover, as shown in FIG. 15, the upper end of the engine 2 on the right is supported by the chassis frame 1 by a torque rod 19, thus suppressing the power unit U from rolling. Description will be made below on the arrangement and specific structure of each of the mounting mechanisms 11, 12, and 13 and torque rod 19.

In FIG. 3, the front mounting mechanism 11 is arranged such that its center O1 is located substantially on a center line C1 of the engine 2 in the vehicular widthwise direction, whereas the rear mounting mechanism 12 is arranged such that its center O2 is located substantially at the center of the transmission 3 in the vehicular widthwise direction. Although it is desirable that the center O2 of the rear mounting mechanism 12 should be located on the center line C1 of the engine 2 in the vehicular widthwise direction, the center O2 of the rear mounting mechanism 12 in the embodiment is slightly shifted leftward of the center line C1 of the front mounting mechanism 11. A shift of the center O2 of the rear mounting mechanism 12 with respect to the center O1 of the front mounting mechanism 11 falls within, for example, angle $\theta1=\pm5°$ around the center O1 of the front mounting mechanism 11 with respect to the center line C1 of the engine 2 in the vehicular widthwise direction.

Although it is desirable that the center O3 of the intermediate mounting mechanism 13 should be located on the center line C1 of the engine 2 in the vehicular widthwise direction, it is slightly shifted leftward in the embodiment. A shift of the center O3 of the intermediate mounting mechanism 13 with respect to the center O1 of the front mounting mechanism 11 is about angle $\theta1=\pm5°$ around the center O1 of the front mounting mechanism 11 with respect to the center line C1 of the engine 2 in the vehicular widthwise direction.

[Detailed Structure of Front Mounting Mechanism 11]

Figure 7:
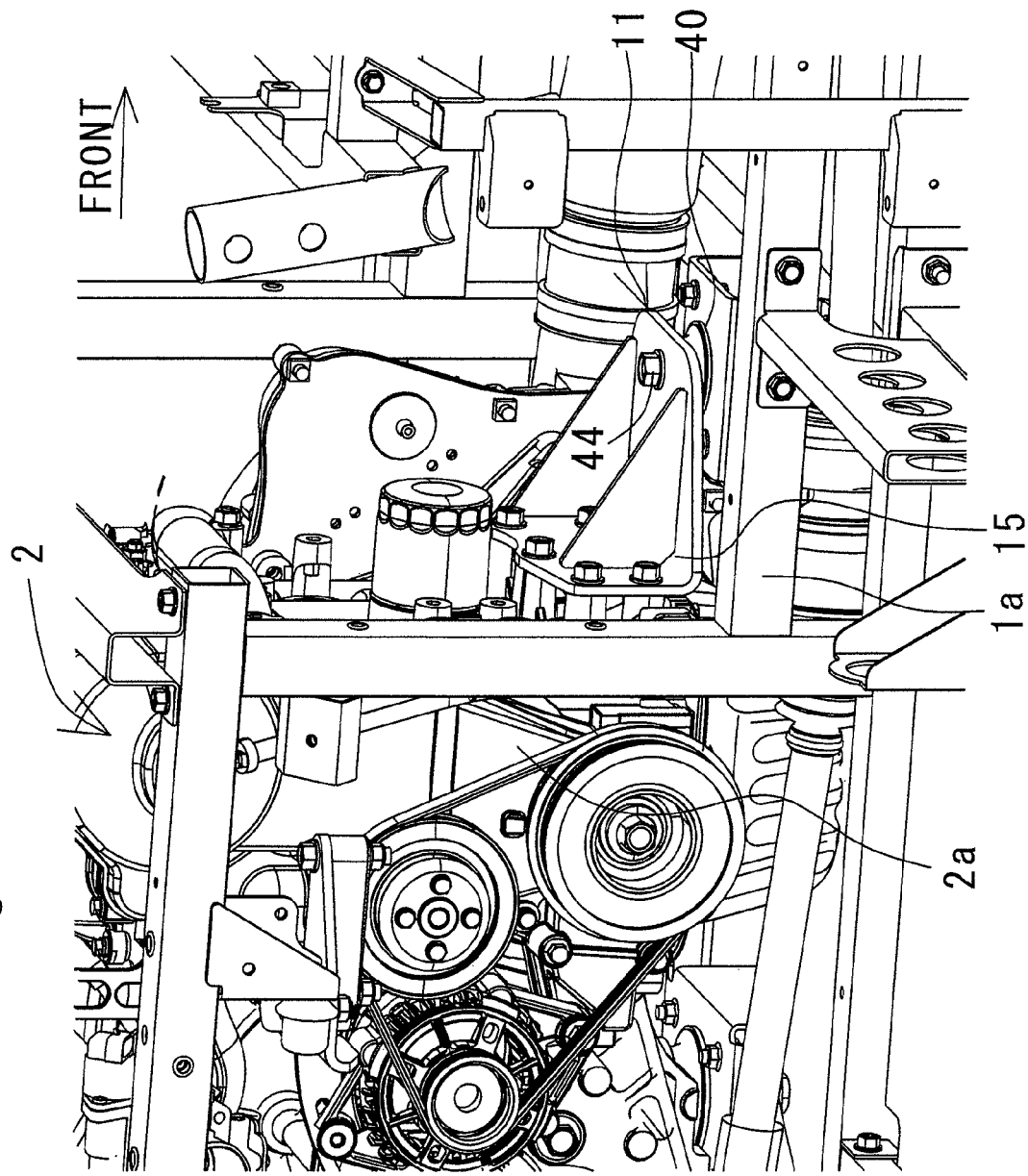
FIG. 7 is a perspective view showing a front mounting mechanism for the power unit shown in FIG. 1.
Figure 8:
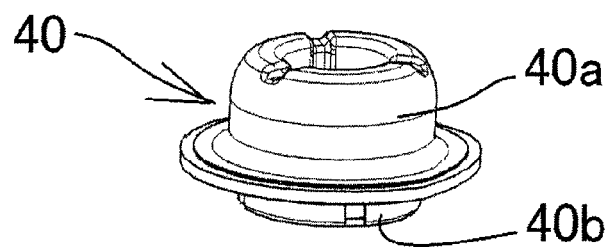
FIG. 8 is a perspective view showing a damper in the front mounting mechanism shown in FIG. 7.
Figure 9:
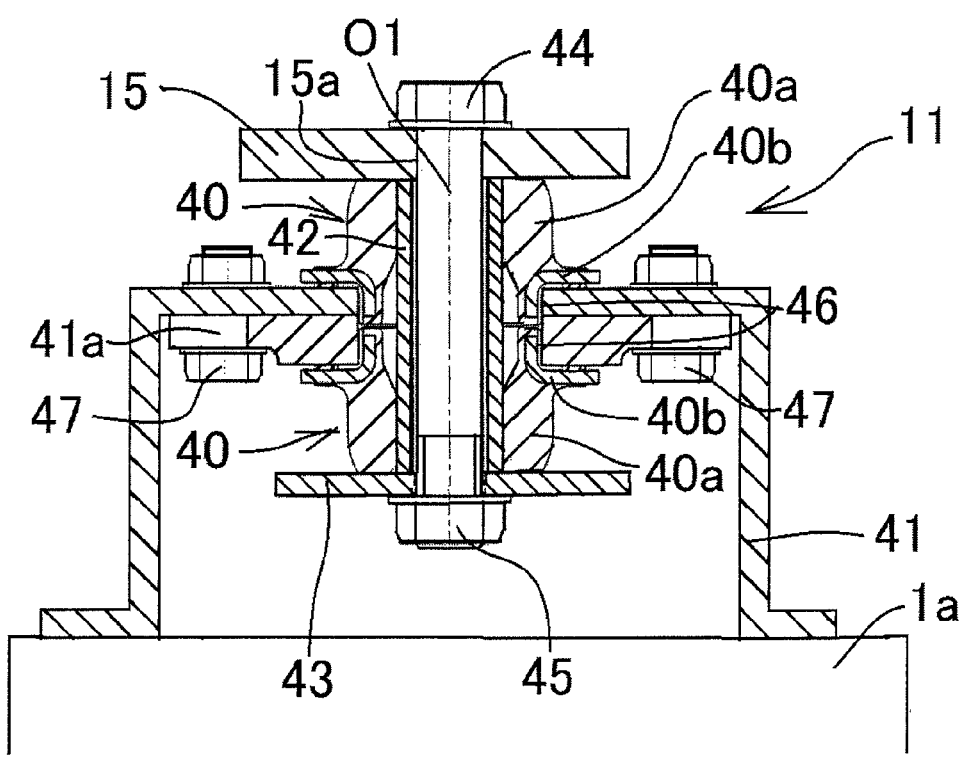
FIG. 9 is a longitudinal cross-sectional view showing the front mounting mechanism shown in FIG. 7.

FIG. 7 is a perspective view showing the front mounting mechanism 11; FIG. 8 is a perspective view showing a rubber damper for the front mounting mechanism 11; and FIG. 9 is a vertical cross-sectional view in a direction perpendicular to the lengthwise direction of the front mounting mechanism. In FIG. 7, the front bracket 15 is formed into a substantially L shape, as viewed sideways. The substantially vertical wall of the front bracket 15 is securely fixed to the fore surface of the cylinder block 2a of the engine 2. A rubber damper 40 for the front mounting mechanism 11 is mounted to the lower surface of the bottom wall of the front bracket 15.

In FIG. 8, the rubber damper 40 includes a cylindrical rubber body 40a and an annular washer 40b thermally press-fitted to one end of the rubber body 40a in a vertical direction. The washer 40b is formed so as to have a substantially L-shaped cross section.

In FIG. 9, an inversed U-shaped bracket 41 is securely fixed at the upper surface of the lower frame member (i.e., a member extending in the vehicular widthwise direction) 1a of the chassis frame 1 via a bolt, not shown. A reinforcing plate 41a also serving as a spacer is securely fixed to the lower surface of the upper wall of the bracket 41 via a bolt 47 or the like. A damper mounting hole 46 that penetrates in the vertical direction is formed on the upper wall of the mounting bracket 41 and the reinforcing plate 41a.

The front mounting mechanism 11 is provided with the pair of upper and lower rubber dampers 40. The upper rubber damper 40 is disposed on the upper wall of the bracket 41 with the washer 40b oriented downward, wherein the cylindrical portion of the washer 40b is fitted to the mounting hole 46 in a vertically movable manner. Meanwhile, the lower rubber damper 40 is disposed below the reinforcing plate 41a with the washer 40b oriented upward, wherein the cylindrical portion of the washer 40b is fitted to the mounting hole 46 of the reinforcing plate 41a in a vertically movable manner.

A collar 42 penetrating both of the rubber dampers 40 in the vertical direction is inserted at the inner circumferential surfaces of the upper and lower rubber dampers 40. An annular pressing plate 43 made of metal abuts against the lower end of the collar 42 from below, and the front bracket 15 of the engine 2 abuts against the upper end of the collar 42 from above.

A bolt 44 is inserted from above into the bolt insertion hole 15a of the front bracket 15, the collar 42, and the pressing plate 43. A nut 45 is screwed at the lower end of the bolt 44, thereby integrally coupling the front bracket 15, the collar 42, and the pressing plate 43, and the upper and lower rubber dampers 40 are compressed in the vertical direction at a predetermined initial set load.

The front mounting mechanism 11 having the above structure can resiliently absorb or suppress by the compression of either one of the dampers 40 even in the case where the front bracket 15 of the engine 2 is vibrated either upward or downward with respect to the lower frame member 1a. For example, in the case where the front bracket 15 is separated upward from the lower frame member 1a, the lower rubber damper 40 is compressed. To the contrary, in the case where the front bracket 15 approaches the lower frame member 1a downward, the upper rubber damper 40 is compressed.

[Detailed Structure of Rear Mounting Mechanism 12]

Figure 10:
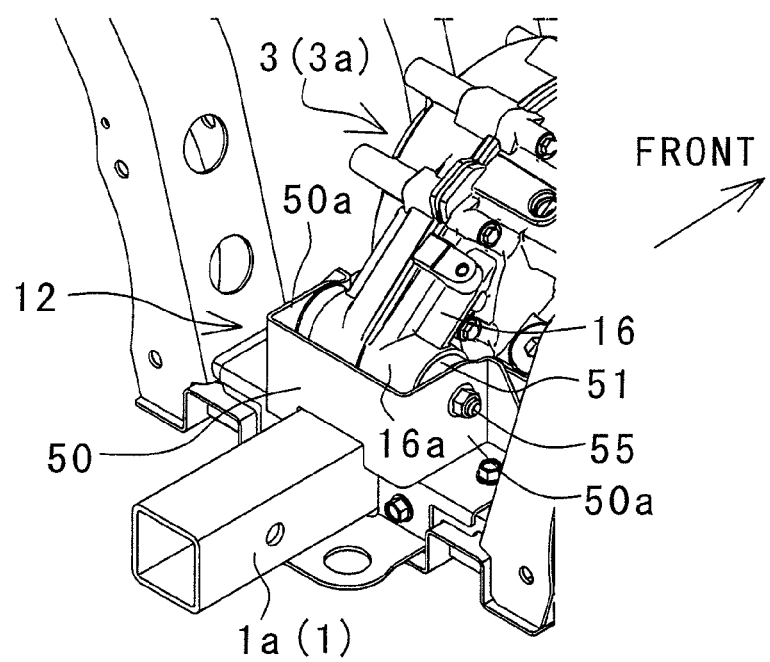
FIG. 10 is a perspective view showing a rear mounting mechanism for the power unit shown in FIG. 1.
Figure 11:
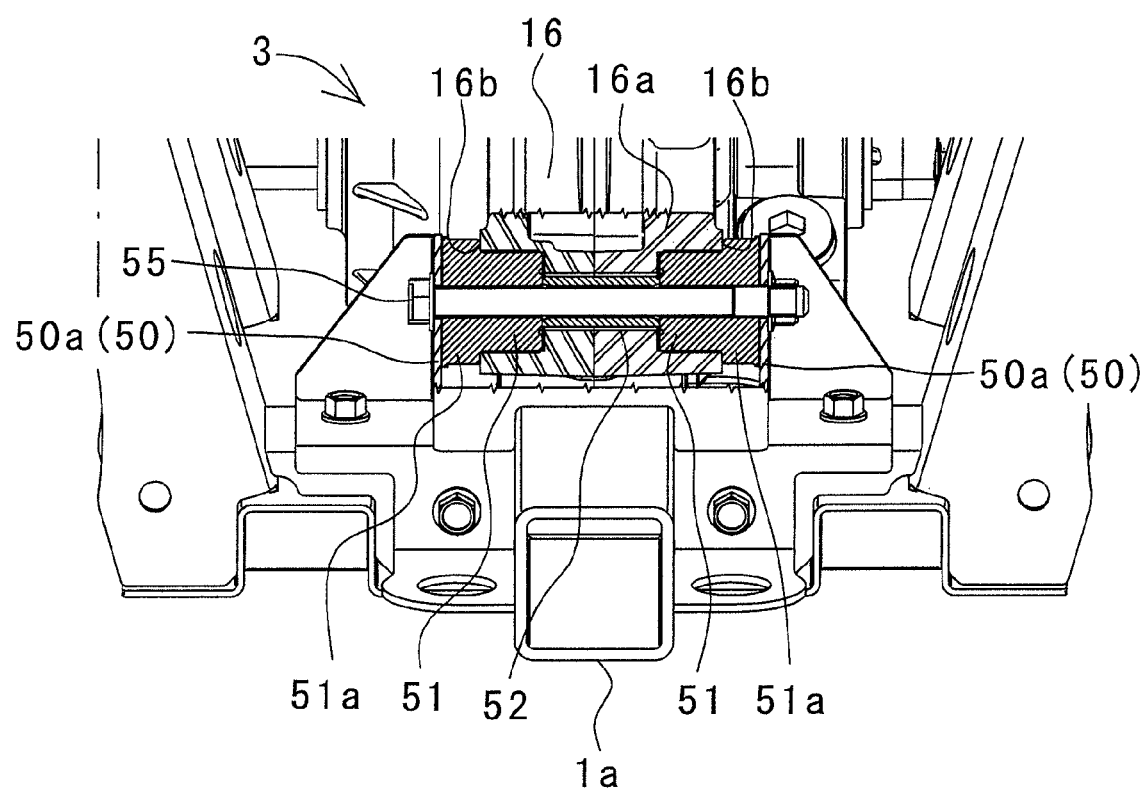
FIG. 11 is a longitudinal cross-sectional view showing the rear mounting mechanism shown in FIG. 10.

FIG. 10 is a perspective view showing the rear mounting mechanism 12; and FIG. 11 is a vertical cross-sectional view perpendicular to the lengthwise direction of the rear mounting mechanism 12. In FIG. 10, the rear bracket 16 integrally includes a cylindrical portion 16a having a cylindrical axis extending in the vehicular widthwise direction. A pair of right and left rubber bushes 51 is fitted into the cylindrical portion 16a. Meanwhile, a mounting bracket 50 formed into a substantially U shape, as viewed on a plane, is securely fixed at the upper surface of the lower frame member (i.e., a portion extending in the lengthwise direction) 1a. The right and left rubber bushes 51 are supported on right and left side walls 50a of the mounting bracket 50 via a bolt 55.

In FIG. 11, each of the rubber bushes 51 has an outward flange 51a projecting outward in a radial direction. Each of the flanges 51a is held between the side wall 50a of the mounting bracket 50 and the end surface 16b of the cylindrical portion 16a in the vehicular widthwise direction. A pipe-like metallic collar 52 is held between the right and left rubber bushes 51. The end surface of each of the rubber bushes 51 at the vehicle widthwise center abuts against the end surface of the collar 52 in the vehicular widthwise direction. A pair of right and left annular steps is formed at the inner circumferential surface of the cylinder 16a. The end surface at the vehicular widthwise center of each of the rubber bushes 51 faces each of the annular steps with a clearance.

The above-described bolt 55 is inserted into the side wall 50a of one of the mounting brackets 50 from either right or left. The bolt 55 sequentially passes through one of the rubber bushes 51, the collar 52, the other rubber bush 51, and the other side wall 50a. A nut 56 is screwed at the tip end of the bolt 55. Consequently, the rear bracket 16 of the gear type transmission 3 is supported by the lower frame member 1a via the rubber bushes 51.

The rear mounting mechanism 12 having the above configuration can absorb or suppress vibrations by the compression of either one of the rubber bushes 51 even in the case where the gear type transmission 3 is vibrated either rightward or leftward with respect to the lower frame member 1a. For example, in the case where the rear bracket 16 is vibrated leftward, the flange 51a of the left rubber bush 51 is compressed in the vehicular widthwise direction. In the case where the rear bracket 16 is vibrated rightward, the flange 51a of the right rubber bush 51 is compressed in the vehicular widthwise direction. Moreover, in the case where the rear bracket 16 is vibrated in a direction substantially perpendicular to the axis of the cylinder (i.e., vertically and lengthwise) with respect to the lower frame member 1a, both of the rubber dampers 51 are compressed in the radial direction.

[Detailed Structure of Intermediate Mounting Mechanism 13]

Figure 12:
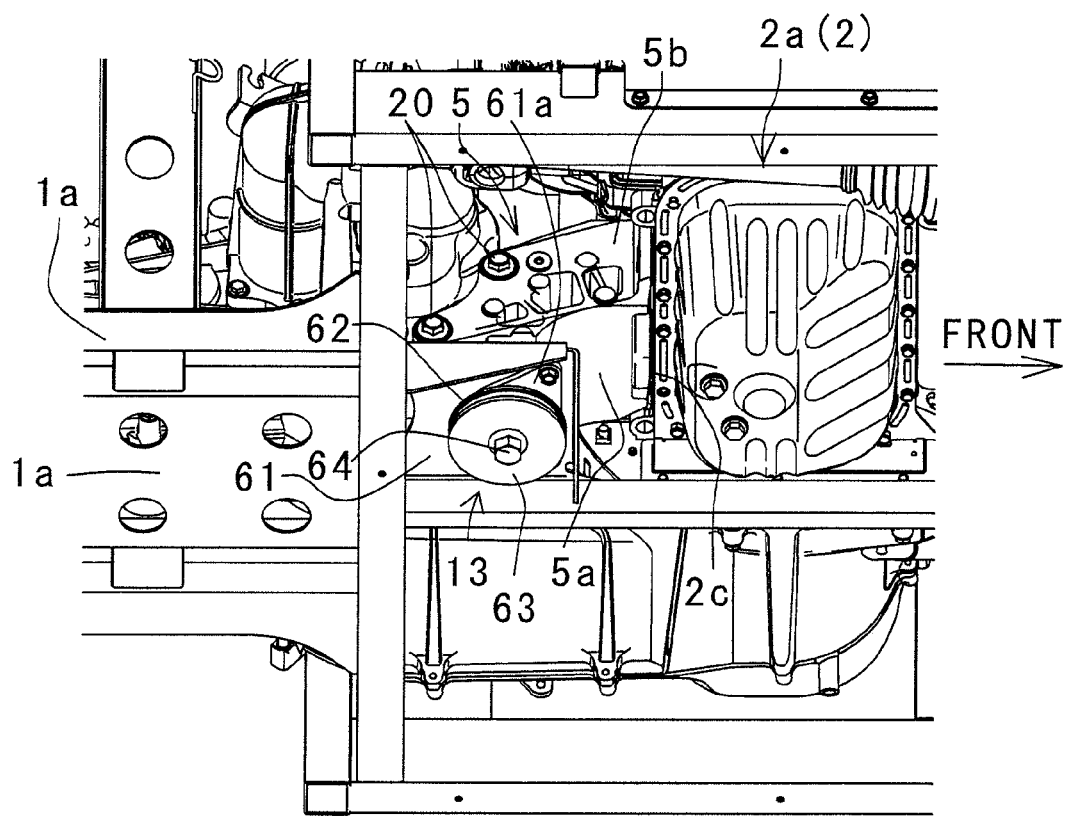
FIG. 12 is a perspective view showing a connecting bracket for the power unit shown in FIG. 1, as viewed from below.
Figure 13:
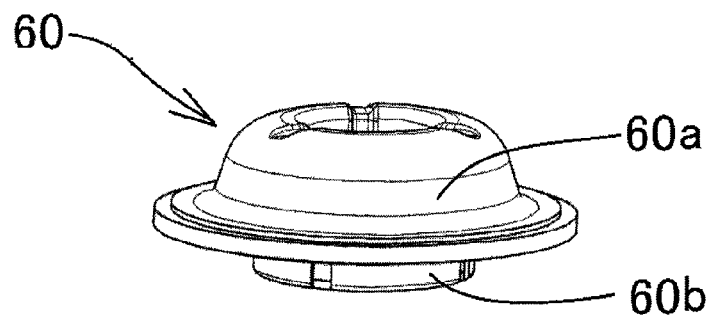
FIG. 13 is a perspective view showing a damper for an intermediate mounting mechanism shown in FIG. 1.
Figure 14:
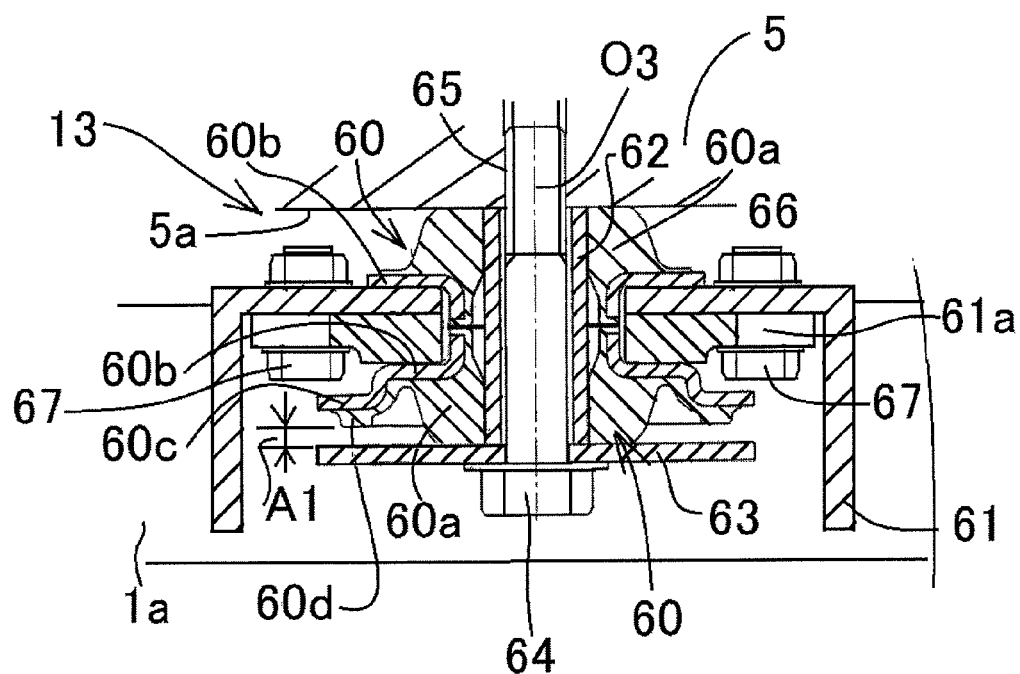
FIG. 14 is a longitudinal cross-sectional view showing an intermediate mounting mechanism shown in FIG. 12.

FIG. 12 is a perspective view showing the intermediate mounting mechanism 13, as slantwise viewed from below; FIG. 13 is a perspective view showing the rubber damper 60 for the intermediate mounting mechanism 13; and FIG. 14 is a vertical cross-sectional view showing the intermediate mounting mechanism 13 in a direction perpendicular to the lengthwise direction. In FIG. 12, an intermediate bracket 61 having a substantially horizontal intermediate mounting surface is securely fixed to the lower frame member 1a by welding or the like. A pair of upper and lower rubber dampers 60 (FIG. 14) is fixed to the intermediate bracket 61.

In FIG. 13, the rubber damper 60 basically has a structure similar to that of the above-described rubber damper 40 for the front mounting mechanism 11. The rubber damper 60 is provided with a cylindrical rubber body 60a and an annular washer 60b thermally press-fitted to one end of the rubber body 60a in the vertical direction. The washer 60b is formed into an L shape in cross section. Here, the diameter of the rubber damper 60 is greater than that of the rubber damper 40 for the front mounting mechanism 11, and therefore, is higher in rubber constant.

In FIG. 14, the intermediate bracket 61 is formed into an inversed U shape. A reinforcing plate 61a also serving as a spacer is securely fixed to the lower surface of the upper wall of the intermediate bracket 61 via a bolt 67 or the like. A damper mounting hole 66 penetrating in the vertical direction is formed at the upper wall of the intermediate bracket 61 and the reinforcing plate 61a.

The intermediate mounting mechanism 13 has the upper and lower rubber dampers 60, like the front mounting mechanism 11. Here, the lower rubber damper 60 includes an annular additional rubber 60d having a greater diameter than that of the rubber body 60a in addition to the rubber body 60a. In this manner, a spring constant is changed at two stages according to a load, so as to further absorb vibrations. In other words, an annular additional portion 60c is formed integrally with the washer 60b at the outer peripheral end of the washer 60b via a step. The annular additional rubber 60d is disposed at the annular additional portion 60c.

A collar 62 penetrating both of the rubber dampers 60 in the vertical direction is inserted at the inner circumferential surface of the upper and lower rubber dampers 60. A metallic annular pressing plate 63 abuts against the lower end of the collar 62 from below, whereas the lower surface of the bottom wall 5a of the connecting bracket 5 abuts against the upper end of the collar 62 from above.

A bolt 64 is inserted into the bolt insertion hole of the pressing plate 63 and the collar 62 from below. The upper end of the bolt 64 is screwed to a female screw hole 65 formed in the connecting bracket 5, thereby integrally coupling the connecting bracket 5, the collar 62, and the pressing plate 63. Furthermore, the upper and lower rubber dampers 60 are compressed in the vertical direction at a predetermined initial set load. The additional rubber 60d faces the upper surface of the pressing plate 63 from above with a given clearance A1 defined there between in the assembled state.

Similarly to the front mounting mechanism 11, the intermediate mounting mechanism 13 having the above structure can resiliently absorb or suppress owing to the compression of either of the dampers 60 even in the case where the connecting bracket 5 is vibrated either upward or downward with respect to the lower frame member 1a. Specifically, the lower rubber damper 60 is compressed when the connecting bracket 5 is separated upward from the lower frame member 1a, whereas the upper rubber damper 60 is compressed when the connecting bracket 5 approaches the lower frame member 1a downward.

Particularly, in the case where the connecting bracket 5 is vibrated upward to compress the lower damper 60, only the rubber body 60a is compressed while the pressing plate 63 is moved upward within the clearance A1. When the pressing plate 63 is moved upward beyond the clearance A1, the spring constant of the additional rubber 60d is added, thereby increasing the spring constant of the rubber as a whole, so as to absorb vibrations caused by a large impact force.

[Mounting Structure of Torque Rod 19]

In FIGS. 3 and 15, one end of the torque rod 19 is connected to a bracket 70 disposed in the chassis frame 1 via a ball joint 71. The other end of the torque rod 19 is connected to a bracket 72 for an alternator disposed at the upper end of the engine 2 via a ball joint 73.

[Assembly of Power Unit]

When the power unit U is assembled, first, the connecting bracket 5 is mounted to the engine 2. Specifically, as shown in FIG. 4, the fore end of the fore wall 5c of the connecting bracket 5 abuts against the rear end connecting surface 2c of the cylinder block 2a of the engine 2, and the portion 31 to be stopped on the left side wall 5b of the connecting bracket 5 abuts against the stopper 30 of the cylinder block 2a. In this manner, the connecting bracket 5 is relatively positioned in the vehicular lengthwise direction and in the vehicular widthwise direction with respect to the transmission 3. In this state, the fore wall 5c of the connecting bracket 5 is connected to the connecting surface 2c of the cylinder block 2a via the plurality of bolts 25.

The bolt 25 is inserted into the bolt insertion hole 27 from the rear portion of the fore wall 5c of the connecting bracket 5 in a substantially horizontal state, to be thus screwed to the female screw hole 28. During this bolt insertion operation, as shown in FIG. 5, the connecting bracket 5 is inclined downward from the fore (first) end toward the rear (second) end, thereby securing a sufficient operating space for the bolt behind the fore wall 5c. Accordingly, the bolt insertion operation can be readily achieved.

Subsequently, the rear (second) end of the connecting bracket 5 is connected to the fore end boss 3b of the gear type transmission 3. Specifically, as shown in FIG. 4, the fore end boss 3b of the transmission 3 is held between the right and left side walls 5b at the rear portion of the connecting bracket 5, and then, the two bolts 20 are sequentially inserted into the bolt insertion hole 23 formed in the right side wall 5b of the connecting bracket 5 and the bolt insertion hole 24 formed in the connecting boss 3b from the right portion of the connecting bracket 5, to be thus screwed to the female screw hole 25 formed in the left side wall 5b.

In this fixing operation, the bolt 20 is inserted from the right portion of the connecting bracket 5. Therefore, even in the state in which the connecting bracket 5 has been already connected to the engine 2, the bolt 20 can be readily inserted without any interference with other members.

Effects of Embodiment (1) In FIG. 4, the connecting bracket 5 interposed between the engine 2 and the gear type transmission 3 connects the engine 2 and the gear type transmission 3 to each other, and therefore, the engine 2 and the transmission 3 can be connected to each other without using any sub frame, thereby directly mounting the power unit U to the chassis frame 1. As a consequence, the weight of the vehicle becomes lighter. In addition, when the engine 2 and the gear type transmission 3 are connected to each other, first, the fore (first) end of the connecting bracket 5 is connected to the rear connecting surface (i.e., the first connector) 2C of the engine 2 via the bolt 25 substantially in the vehicular lengthwise direction, and thereafter, the rear (second) end of the connecting bracket 5 is connected to the fore end boss (i.e., the second connector) 3b of the gear type transmission 3 via the bolt 20 in the vehicular widthwise direction. In this manner, the bolt tightening operation can be readily achieved even in a narrow space defined between the engine 2 and the transmission 3.

(2) The engine 2 and the gear type transmission 3 are rigidly connected to each other via the connecting bracket 5, thus accurately determining the relative positions of the engine 2 and the gear type transmission 3.

In particular, in the structure in which the crankshaft of the engine 2 and the input shaft of the gear type transmission 3 are connected to each other via the V belt type continuously variable transmission 6 in a power transmittable manner, the relative positions of the V belt type continuously variable transmission 6 in the vehicular widthwise and lengthwise directions with respect to the engine 2 and the gear type transmission 3 influence the mounting accuracy of the V belt type continuously variable transmission 6. However, the engine 2 and the gear type transmission 3 are rigidly connected to each other via the connecting bracket 5, thus achieving accurate incorporation.

(3) In FIG. 3, the engine 2 and the gear type transmission 3 are rigidly connected to each other via the connecting bracket 5, and therefore, the relative positions of the engine 2 and the gear type transmission 3 can be accurately determined. In particular, in the structure in which the crankshaft (having the axis O11) and the input shaft (having the axis O13) of the transmission 3 are connected via the V belt type continuously variable transmission 6 in the power transmittable manner, the relative positions in the vehicular widthwise and lengthwise directions of the V belt type continuously variable transmission 6 with respect to the engine 2 and the gear type transmission 3 influence the mounting accuracy of the V belt type continuously variable transmission 6. However, the engine 2 and the gear type transmission 3 are rigidly connected via the connecting bracket 5, to be thus accurately incorporated.

(4) In FIG. 4, the rear end connector for the engine 2 has the stopper 30 that abuts against the portion 31 to be stopped of the connecting bracket 5 sideways so as to lock the connecting bracket 5 at a predetermined position in the vehicular widthwise direction. Therefore, the relative positions of the engine 2 and the connecting bracket 5 in the vehicular widthwise direction can be readily determined with high accuracy.

(5) In FIGS. 5 and 6, the connecting bracket 5 is formed such that the rear (second) end on the transmission side is lower than the fore (first) end on the engine side, as viewed sideways. Therefore, in the case where the fore end of the connecting bracket 5 is connected to the engine 2 via the bolt 25 substantially in the lengthwise direction, the operation space for the bolt 25 can be widely secured in the vehicular lengthwise direction, thus facilitating the connecting operation of the fore end of the connecting bracket 5 to the engine 2 via the bolt 25.

(6) In FIGS. 2 and 3, the connecting bracket 5 is arranged substantially at the centers of the engine 2 and the gear type transmission 3 in the vehicular widthwise direction. The lower surface of the connecting bracket 5 is supported at the upper surface of the chassis frame 1 via the intermediate mounting mechanism 13 with the damper. The engine 2 and the gear type transmission 3 are supported substantially at the centers thereof in the vehicular widthwise direction and at the upper surface of the chassis frame 1 via the mounting mechanisms 11 and 12 with the dampers. Moreover, the torque rod 19 for suppressing the engine 2 from rolling in the vehicular widthwise direction is interposed between the engine 2 and the chassis frame 1.

With this configuration, the entire power unit U is put on the chassis frame 1 by the three mounting mechanisms 11, 12, and 13 arranged along the center in the vehicular widthwise direction, and further, the torque rod 19 suppresses the power unit U from rocking around the vehicular lengthwise axis. As a consequence, traveling vibrations that are transmitted to the power unit U during the traveling are finally converted into the vertical vibrations, to be absorbed by the rubber dampers 40 and 60 and the rubber bush 51 of the mounting mechanisms 11, 12, and 13. Thus, the mounting mechanisms 11, 12, and 13 having the simple structures can efficiently absorb the vibrations exerted on the power unit U.

(7) In FIG. 3, the torque rod 19 is disposed in the engine 2 serving as a main vibration source for the power unit U, and therefore, the rolling of the engine can be directly stopped. In particular, since the torque rod 19 is disposed at the upper end of the engine 2, the engine 2 can be suppressed from rolling at a portion as far as possible from the front mounting mechanism 11 (i.e., a rolling center), thus suppressing large vibrations by small force.

(8) In FIG. 7, the front mounting mechanism 11 for the engine 2 is connected to the chassis frame 1 via the bolt 44 inserted from above. On the other hand, in FIG. 10, the rear mounting mechanism 12 for the transmission 3 is connected to the chassis frame 1 via the bolt (i.e., a connecting shaft) 55 to be inserted in the vehicular widthwise direction. The transmission 3 is less vibrated than the engine 2 which is the vibration source, and therefore, the bolt 55 can be readily attached or detached sideways in the connecting structure with the lateral bolt 55.

(9) In FIG. 2, the largest load is exerted on the middle portion in the vehicular lengthwise direction of the power unit U when the engine is vibrated. However, the damping function of the intermediate mounting mechanism 13 for the connecting bracket 5 can switch the spring constant at the two stages. Consequently, in FIG. 9, only the rubber body 60a can absorb the vibrations at a relatively small spring constant in the case of the small vibrations, whereas in the case where a large impact is exerted, the stopper function can be exhibited at the large spring constant added with the spring constant of the additional rubber 60d so as to suppress the large vibrations. That is, a vibration preventing effect is kept while an excessive load can be prevented from being exerted on the engine.

(10) In FIGS. 9 and 14, the respective rubber dampers 40 and 60 of the front mounting mechanism 11 and the intermediate mounting mechanism 13 are configured in such a manner as to be compressed to absorb the vibrations in the case of either the upward vibrations or the downward vibrations in the power unit U. No tension is exerted on the rubber damper 40 or 60, thus prolonging the maintenance or replacement timing of both of the dampers 40 and 60.

Other Embodiments (1) The present invention is also applicable to a power unit for connecting an engine and a gear type transmission via a connecting bracket, wherein the gear type transmission is disposed in front of the engine.

(2) The first tightening member for connecting the connecting bracket 5 to the first connector (i.e., the rear end connecting surface 2c) of the engine 2 is not limited to the bolt 25, and a pin, a rivet, and the like may be used.

(3) The second tightening member for connecting the connecting bracket 5 to the second connector (i.e., the fore end boss 3b) of the transmission 3 is not limited to the bolt 20, and a pin, a rivet, and the like may be used.

(4) The torque rod 19 may be mounted to portions other than the upper right end of the engine 2. As long as the rolling can be suppressed, the torque rod 19 may be mounted anywhere rightward, rearward, and forward of the engine. Moreover, the torque rod may be mounted to the gear type transmission. Additionally, a plurality of torque rods may be disposed.

(5) In the above embodiment shown in FIG. 3, the rear center O2 of the rear mounting mechanism 12 for the gear type transmission 3 in the vehicular widthwise direction is disposed within the range O1 of about ±5° at the fore center O1 with respect to the center line C1 passing the fore center O1 of the engine 2 in the lengthwise direction. However, the present invention is not limited to the above range, and includes a structure in which the rear center O2 falls within an angular range wider than the above range. In other words, the present invention is applicable to a structure in which the transmitting force to the chassis frame, caused by the engine vibrations may act on the chassis frame 1 in such a manner as to roll on the line C1 connecting the front and rear mounting mechanisms to each other.

(6) Although the power unit has the parallel 3-cylinder engine in the above embodiment, the present invention is also applicable to multiple cylinder parallel engine having two or four or more cylinders or a V type engine.

(7) The transmission connected to the fore or rear portion of the engine is not limited to the gear type transmission. Therefore, the present invention is also applicable to a power unit connected to a chain type transmission or a hydraulic transmission.

(8) The present invention is not limited to the structure in the above embodiment. Therefore, the present invention encompasses various modifications within a scope without departing from the contents described in the claims.

What is claimed is:

1. A power unit for a utility vehicle to be mounted to a chassis frame, the power unit comprising:
   an engine;
   a transmission arranged on one side in a vehicular lengthwise direction with respect to the engine and formed independently of the engine;
   a V belt continuously variable transmission for connecting a crankshaft of the engine and an input shaft of the transmission to each other in a power transmittable manner; and
   a connecting bracket interposed between the engine and the transmission;
   wherein the engine includes a first connector having, at a surface facing the transmission, a first mounting hole substantially parallel to a vehicular lengthwise direction, and a first tightening member to be inserted into the first mounting hole on a side opposite to the engine in the vehicular lengthwise direction connecting a first end of the connecting bracket to the first connector; and
   wherein the transmission includes a second connector having, at an end facing the engine, a second mounting hole penetrating in a vehicular widthwise direction, and a second tightening member to be inserted into the second mounting hole in the vehicular widthwise direction connecting a second end of the connecting bracket to the second connector.

2. The power unit for utility vehicle according to claim 1, wherein the first connector of the engine has a stopper abutting against the connecting bracket to lock the connecting bracket at a predetermined position in the vehicular widthwise direction.

3. The power unit for utility vehicle according to claim 1, wherein the connecting bracket is formed such that the second end on the transmission side is lower than the first end on the engine side.

4. The power unit for utility vehicle according to claim 1, wherein:
- the connecting bracket is arranged substantially at the center of the engine and the center of the transmission in the vehicular widthwise direction;
- a lower surface of the connecting bracket is supported at an upper surface of the chassis frame via a mounting mechanism with a damper;
- the engine and the transmission in the vehicular widthwise direction are supported substantially at the respective center thereof at the upper surface of the chassis frame via mounting mechanisms with dampers; and
- a torque rod for suppressing the engine from rolling in the vehicular widthwise direction is interposed between the engine and the chassis frame.

* * * * *